United States Patent Office 3,595,824
Patented July 27, 1971

3,595,824
POLYESTER PLASTICIZER FOR POLYVINYL
CHLORIDE FABRICS
Robert D. Aylesworth, Philip A. Froehlich, Thomas B. Hilton, and Herbert G. Rodenberg, Cincinnati, Ohio, assignors to Emery Industries, Inc., Cincinnati, Ohio
No Drawing. Original application Sept. 12, 1966, Ser. No. 578,483, now Patent No. 3,501,554, dated Mar. 17, 1970. Divided and this application Aug. 11, 1969, Ser. No. 870,701
Int. Cl. C08g 39/10, 51/38
U.S. Cl. 260—31.6                    4 Claims

ABSTRACT OF THE DISCLOSURE

The invention relates primarily to drycleanable vinyl fabrics and other vinyl constructions and to novel plasticizers for polyvinyl chloride resins having an improved resistance to extraction in drycleaning solvents, such as perchloroethylene. More particularly, the invention relates to new polymeric plasticizers and polyvinyl chloride resins plasticized therewith. The plasticizers comprise non-chain terminated polyesters having a molecular weight range of from about 1500 to 30,000 resulting from esterification of a dibasic acid-glycol reaction mixture consisting essentially of two or more alkanedioic acids having from 4 to 12 carbon atoms, and two or more different alkylene glycols having from 2 to 6 carbon atoms, at least one having 2 or 3 carbon atoms and at least one having 3 to 6 carbon atoms in which the content of dibasic acids below $C_6$ is from about 0–50 equivalent percent, the content of $C_6$ to $C_9$ dibasic acids is from about 50–100 equivalent percent, and that of $C_{10}$ to $C_{12}$ dibasic acids is from 0–50 equivalent percent, based on the total equivalents of dibasic acid, and the content of $C_2$ to $C_3$ and $C_3$ to $C_6$ glycols each being from 20–80 equivalent percent based on the total equivalents of glycol in the reaction mixture. The plasticizers of this invention may also include from 1 to about 40% by weight based on the weight of the polyester of a super polyester polymer having a molecular weight of above 15,000.

This is a division of application Ser. No. 578,483 filed Sept. 12, 1966, now U.S. Pat. No. 3,501,554.

BACKGROUND OF THE INVENTION

It is generally recognized that plasticized vinyl resins and their application in the coated fabrics industry have reached a relatively high degree of development. In spite of this fact, vinyl constructions could not be drycleaned without exhibiting stiffening and shrinkage caused primarily by extraction of the plasticizer by the drycleaning solvents, particularly chlorinated hydrocarbons. The most common chlorinated solvent today is perchloroethylene and in this specification resistance to extraction is measured in respect to this solvent. For example, a well known commercial polyester plasticizer is 20–25% extracted from vinyl when exposed to perchloroethylene. This deficiency imposed definite limitations on the use of vinyl constructions in outer-wear garments having high quality fabric linings or flocked linings which require drycleaning. It also discouraged use of vinyl fabrics in fire-retardant draperies and vehicular upholstery where ease of maintenance demands that the fabrics be drycleanable.

Thus, there remained an unfilled need for plasticizers for polyvinyl chloride resin constructions exhibiting an improved resistance to extraction by drycleaning solvents, e.g. perchloroethylene. Fulfilling this need will permit extension of vinyl fabric use into drycleanable constructions. This solvent extraction resistance, however, had to be developed in the plasticizer without detracting from compatibility and permanence properties possessed by available polymeric plasticizers for PVC resin films. This objective is accomplished by the plasticizers and plasticized vinyl resins of the present invention which exhibit vastly improved resistance to perchloroethylene extraction and also excellent compatibility of the plasticizer. Compatibility avoids "bloom" (a solid whitish exudate on the surface of the vinyl) and "spewing" (a liquid exudate of plasticizer on the resin surface). In addition, the plasticizers of the invention possess permanence and are characterized by excellent stability to heat and light, high efficiency (ratio of plasticizer to resin required to achieve desired softness) and ease of processability on existing equipment using conventional compounding and fabricating techniques.

Monomeric diester and polymeric polyester plasticizers have been utilized extensively to plasticize vinyl resins. The term "vinyl" as used herein includes polyvinyl chloride, and vinyl chloride copolymers with vinyl acetate, vinylidene chloride, and other copolymerizable olefiinic monomers as is well known in the art of film-forming polymers. For a high degree of permanence, the polymeric plasticizers are generally preferred, because they are less volatile and exhibit greater resistance to extraction by soapy water and oils. The monomeric and polymeric esters most extensively used are those formed by esterification or aromatic or aaliphatic dibasic acids or mixtures of the same, such as phthalic, azelaic, adipic, and sebacic acids with monohydric and polyhydric aliphatic alcohols of from 6 to 10 carbon atoms. In the case of polymeric plasticizers where relatively low molecular weight liquid plasticizers are desired, monohydric or monobasic acids are employed as chain-stoppers or terminators. See, for example, U.S. Pat. No. 2,815,354 illustrating the use of acylated liquid polymeric polyester plasticizers where various monobasic acids are used as chain-stoppers.

DESCRIPTION OF THE INVENTION

We have found that improved plasticizers and plasticized polyvinyl resins are provided by polymeric polyesters comprising non-chain stopped polyesters having a molecular weight range of from about 1500 to 30,000 resulting from the esterification of a dibasic acid-alkylene glycol reaction mixture consisting essentially of two or more alkanedioic acids having from 4 to 12 carbon atoms, and two or more different alkylene glycols at least one glycol being $C_2$ to $C_3$ and at least one $C_3$ to $C_6$ glycol, and in which the content of dibasic acids below $C_6$ is from 0–50, preferably 0–30 equivalent percent, the content of dibasic acid from $C_6$ to $C_9$ is from 50–100, preferably 70–100 equivalent percent, and the content of $C_{10}$ to $C_{12}$ is 0–50 equivalent percent, preferably 0–30 equivalent percent based on the total equivalents of dibasic acid, and the content of $C_2$ to $C_3$ and $C_3$ to $C_6$ glycols is each from 20–80 equivalent percent based on the total equivalents of glycol in the reaction mixture. It is a requirement of this invention that at least two glycols of different chain length be used. Thus when the lower glycol ($C_2$ to $C_3$) has three carbon atoms, the higher glycol ($C_3$ to $C_6$) must have at least 4 carbon atoms. Particularly satisfactory plasticizers may be prepared using a dibasic acid mixture of from 15–50 equivalent percent of a $C_4$–$C_5$ alkanedioic acid, 50–80 equivalent percent of a $C_6$–$C_9$ alkanedioic acid, and 15–50 equivalent percent of a $C_8$–$C_{12}$ alkanedioic acid. In using an acid mixture in these ranges, the $C_6$ dibasic acid should predominate when the content of $C_{10}$–$C_{12}$ acid exceeds that of the $C_4$ to $C_5$ acid and the $C_9$ dibasic acid should predominate when the $C_4$ to $C_5$ acid exceeds the content of the $C_{10}$ to $C_{12}$ dibasic acid. Advantageously, merely by controlling the cooking time and temperature, polyesters may be readily prepared in the molecular weight and viscosity range desired, i.e. 1500 to 30,000, preferably 3000 to 15,000, with a viscosity in excess of 500 centistokes at 210° F., preferably in excess of 2000 centistokes at 210° F. The plasticizers range from viscous liquids to solids with the less viscous liquids and the solids being preferred for ease of handling.

Although the components of the polyester plasticizers of the present invention may be individually described in the prior art, the particular plasticizer compositions are novel and possess unique resistance to perchloroethylene combined with compatibility efficiency and permanence. This flows from the particular combinations and proportions of the various glycols and dibasic acids of which they are composed and the fact that they are not chain-terminated and possess a molecular weight range as defined above.

The preferred practice in forming the polyesters from the mixture of glycols and dibasic acids is to employ a small excess of the glycol (dihydric alcohol) components over the stoichiometric or equivalent amount of dibasic acids. This excess is distilled off as the esterification reaction is carried to completion and recycled to the esterification reactor.

Esterification and reaction of the components to obtain the desired polyester plasticizer composition is carried out in conventional equipment using established esterification procedures. For example, the necessary components, selected in accordance with the polymer character and structure desired in the plasticizer, are charged into a suitable esterification kettle and heated at atmospheric pressure at temperatures on the order of about 150–250° C. for a period of time sufficient to substantially complete esterification. Completion of the esterification takes place with a heating period of about 3 to 8 hours. The reaction may be forced to completion by distillation in vacuum (typically 2–50 mm. Hg absolute at 200–250° C.) until a suitable low acid value such as 0.5 to 6 is obtained. The desired molecular weight is obtained by reacting until the polyester analyzes at a selected hydroxyl number value. The distillation in vacuum removes any excess glycol and also small amounts of volatile materials, the plasticizer is cooled and is normally ready for use.

If an improvement in color is desired, the product may be bleached by any of the well known and accepted bleaching agents, e.g. hydrogen peroxide or hypochlorite. Alternatively, it can be decolorized by filtering through a filter aid, charcoal or bleaching clay.

Esterification may be facilitated by the use of suitable esterification catalysts, such as phosphoric acid paratoluene sulfonic acid, stannous oxalate, an alkyl tin oxide or a smiliar catalyst in small percentages. The catalyst may be deactivated or removed by filtering or other conventional means after esterification is completed. Esterification without a catalyst is also complated with somewhat longer reaction times to reach desired molecular weight and viscosity.

The dibasic acids used in forming the polyester plasticizer are those alpha-omega-alkanedioic acids which contain from 4–12 carbon atoms in the molecule as represented by succinic, glutaric, adipic, pimelic, suberic, azelaic, sebacic and dodecanedioic acids, as well as the anhydrides of said acids. Some aromatic dibasic acid content may be tolerated in the compositions of the invention without adversely affecting the desired properties, e.g. up to about 20 to 25 equivalent percent of phthalic, terephthalic, hexahydrophthalic, etc.

The glycols employed are dihydric alcohols containing from 2 to 6 carobn atoms which may be of either straight chain or branched structure. The hydroxyl groups may be either primary or secondary, but glycols containing a tertiary hydroxyl group are not recommended. Examples of glycols which may be used are ethylene, 1,2 propylene, 1,3 propylene, neopentyl, 1,3 butylene, 1,4 butylene, pentamethylene and hexamethylene. Preferred glycols are ethylene, 1,3 propylene, neopentyl, and 1,4 butylene. To accelerate the rate of reaction and complete the entire reaction more quickly, it is the general practice to employ an excess of the glycol. Also a lower acid number is desirable and is more easily obtained without chemical neutralization with excess glycol.

The novel plasticizers of this invention, as defined above, can be employed in varying proportions to prepare vinyl formulations for various purposes, other than drycleanable fabrics and with a wide range of properties. The proportion of plasticizer used may vary from about 30 to 160, preferably 70 to 100 parts by weight per hundred parts of resin (p.h.r.). For general purposes, these plasticizers may be combined with others and when this is done the total amount of plasticizer should generally fall in the above ranges. For drycleanable vinyls, these plasticizers are generally used alone, since their dilution with others generally detracts from resistance of the vinyl to drycleaning solvents.

It has also been discovered that in some instances the susceptibility of the polyesters of the present invention to solvent extraction can be increased by the incorporation in the polyester of a super polymer, i.e. a very high molecular weight polyester, such as those made from such alcohol-acid combinations as terephthalic acid and ethylene glycol or other super polyester polymers having a molecular weight of about 15,000 to 40,000 preferably about 20,000 to 30,000. The super polymer is intermixed with the polyester in amounts of from about 1% by weight to 40% by weight, preferably about 10 to 30% by weight based on the total weight of the polyester composition including the super polyester polymer.

The polyvinyl chloride compositions may also be compounded with the usual stabilizers to protect the resin from degradation and decomposition by light and heat, fillers, pigments, dyes for coloring, mold lubricants and other additives well known to those familiar with the art.

The present invention is described in greater detail by means of the following examples which constitute complete specific embodiments of the plasticizers, their preparation and use in vinyl films.

EXAMPLE 1

Preparation of typical plasticizer

| Reactant: | Percent equivalent |
|---|---|
| Succinic anhydride | 25. |
| Adipic acid | 25. |
| Azelaic acid | 50. |
| Ethylene glycol | 34+(25 equivalent percent excess based on total acid equivalents).[1] |
| 1,4-butylene glycol | 33. |
| Neopentyl glycol | 33. |

[1] The 25% excess of ethylene glycol is to aid in driving the reaction toward completion.

The esterification was carried out by charging the above materials into a 3-necked, round-bottom flask equipped with a suitable agitator, a thermometer, and a medium length Vigreaux distillation column and condenser. The condenser was so arranged that material could be distilled from the reaction at either atmospheric or reduced pressure. The mixture was esterified by slowly heating the contents of the flask to 225–235° C., while the water formed was slowly distilled out through the column and condensed. The temperature was held at this level, at atmospheric pressure, until the reaction slowed down materially as evidenced by a reduced rate of water evolution. When this point was reached, the mixture was subjected to distillation under reduced pressure to help complete the reaction and to remove excess ethylene glycol. Specifically, the pressure was reduced gradually by use of a vacuum pump, with the temperature at 220–250° C., at such a rate that a controlled distillation of volatile materials took place to a final pressure of 2 mm. Hg at 235° C. The progress of the esterification was followed by determining the acid value, while the amount of excess glycol removed was measured by means of hydroxyl value determinations. When the acid value reached a level below 2.0 and the hydroxyl value at a level below 20, the reaction was considered complete. The esterification mixture was then cooled to room temperature, and the clear, amber-colored liquid, which was very viscous, was evaluated as a plasticizer without further processing or modification. When incorporated into PVC (polyvinylchloride) resin, it produced a clear, pliable sheet and was compatible with the resin.

The other plasticizer compositions listed in Table I below were prepared in substantially the same manner as described in this Example 1.

with the actual commercial drycleaning procedure when vinyl swatches plasticized with polyesters of the invention were attached to a towel and run through five commercial drycleaning cycles in which perchloroethylene was the cleaning agent.

The perchloroethylene extractions were performed on specimens made from all the plasticizers listed in Table I and on certain commercial polyesters which are considered solvent resistant.

TABLE I

| Example No. | Polyester composition—percent equivalents | | | | | | | | P.h.r. | Percent extraction [1] |
|---|---|---|---|---|---|---|---|---|---|---|
| | Succinic anhydride | Adipic acid | Azelaic acid | Dodecane-dioic acid | Ethylene glycol | 1,4-butylene glycol | Neopentyl glycol | 1,2-propylene glycol | | |
| 1 | 25 | 0 | 75 | 0 | 50 | 0 | 50 | 0 | 80 | 12.4 |
| 2 | 25 | 0 | 75 | 0 | 75 | 25 | 7 | 0 | 80 | 5.9 |
| 3 | 30 | 0 | 70 | 0 | 80 | 0 | 20 | 0 | 80 | 10.2 |
| 4 | 40 | 0 | 60 | 0 | 50 | 50 | 0 | 0 | 80 | 8.0 |
| 5 | 40 | 0 | 60 | 0 | 50 | 0 | 50 | 0 | 80 | 11.1 |
| 6 | 50 | 0 | 50 | 0 | 50 | 0 | 50 | 0 | 80 | 8.4 |
| 7 | 0 | 57 | 43 | 0 | 75 | 25 | 0 | 0 | 80 | 4.6 |
| 8 | 0 | 57 | 43 | 0 | 50 | 50 | 0 | 0 | 80 | 6.2 |
| 9 | 0 | 57 | 43 | 0 | 50 | 0 | 50 | 0 | 80 | 6.9 |
| 10 | 0 | 57 | 43 | 0 | 34 | 33 | 33 | 0 | 80 | 9.3 |
| 11 | 0 | 80 | 20 | 0 | 75 | 25 | 0 | 0 | 80 | 3.3 |
| 12 | 0 | 80 | 20 | 0 | 50 | 50 | 0 | 0 | 65 | 2.9 |
| 13 | 0 | 80 | 20 | 0 | 50 | 50 | 0 | 0 | 80 | 3.8 |
| 14 | 0 | 80 | 20 | 0 | 50 | 50 | 0 | 0 | 95 | 4.3 |
| 15 | 0 | 80 | 20 | 0 | 50 | 0 | 50 | 0 | 80 | 6.5 |
| 16 | 0 | 80 | 20 | 0 | 50 | 50 | 0 | 0 | 40 | 0.9 |
| 17 | 0 | 80 | 20 | 0 | 50 | 50 | 0 | 0 | 90 | 3.1 |
| 18 | 0 | 80 | 20 | 0 | 50 | 50 | 0 | 0 | 140 | 5.1 |
| 19 | 15 | 48 | 37 | 0 | 50 | 0 | 50 | 0 | 80 | 8.5 |
| 20 | 15 | 48 | 37 | 0 | 50 | 0 | 50 | 0 | 40 | 0.0 |
| 21 | 15 | 48 | 37 | 0 | 50 | 0 | 50 | 0 | 90 | 7.6 |
| 22 | 15 | 48 | 37 | 0 | 50 | 0 | 50 | 0 | 140 | 12.4 |
| 23 | 25 | 55 | 20 | 0 | 66 | 17 | 17 | 0 | 80 | 3.6 |
| 24 | 25 | 55 | 20 | 0 | 66 | 17 | 17 | 0 | 40 | 0.1 |
| 25 | 25 | 55 | 20 | 0 | 66 | 17 | 17 | 0 | 90 | 3.3 |
| 26 | 25 | 55 | 20 | 0 | 66 | 17 | 17 | 0 | 140 | 5.2 |
| 27 | 25 | 55 | 20 | 0 | 50 | 50 | 0 | 0 | 80 | 3.6 |
| 28 | 25 | 25 | 50 | 0 | 34 | 33 | 33 | 0 | 80 | 8.8 |
| 29 | 0 | 80 | 20 | 0 | 0 | 50 | 0 | 50 | 80 | 3.8 |
| 30 | | | | | | | | | 80 | [2] 18.3 |
| 31 | 0 | 0 | 100 | 0 | 0 | 0 | 100 | 0 | 80 | 23.0 |
| 32 | 20 | 60 | 0 | 20 | 50 | 50 | 0 | 0 | 80 | 4.6 |
| 33 | 0 | 0 | 100 | 0 | 0 | 0 | 0 | 100 | 80 | [2] 23.0 |

[1] With perchloroethylene in 24 hours.
[2] Commercial polyesters of the prior art regarded as having good solvent resistance.

For evaluating the plasticizers of the invention, those shown in Table I were compounded with the following PVC resin formulations in a stainless steel beaker by hand mixing with a spatula:

100 gms. PVC resin (Geon 101)
2 grams Ferro 1820 stabilizer
1 gm. Ferro 903 stabilizer
Plasticizer in amount (p.h.r.) indicated in Table I.

The compounded resin in liquid condition was poured onto the rolls of a standard two-roll rubber mill, with 6 inch x 12 inch rolls which were heated to 170° C. and set for a sheet thickness of 0.25 inch. The mixture was milled for approximately 10 minutes then removed in the form of a sheet. A molded sheet was then prepared by pressing in a chrome-plated ASTM mold with a cavity of 6 inches x 8 inches x 0.020 inch in a hydraulic press at 177° C. for six minutes with a final pressure of 1500 pounds per square inch. From the molded sheet circular test specimens 2.5 inches in diameter were cut from the pressed sheet using a die in a hand-operated press. Duplicate specimens from each sheet were tested as described below.

The extraction of the plasticizer from the resin sheet in the presence of perchloroethylene is determined by weighing the duplicate circular specimens and then suspending them in a one pint jar filled with the solvent. The samples were kept immersed at 25° C. for 24 hours. The samples were then removed and dried for 16 hours at 70° C., and the specimens were reweighed to determine the loss as a percentage of the original weight.

The data relating to percent extraction with perchloroethylene in 24 hours was found to correlate closely

EXAMPLE 34

A plasticizer of this invention was prepared in the following manner. A mixture of 150 grams of the polyester of Example 9 and 50 grams of a super polyester polymer, sold under trademark Mylar, were heated and agitated (under a $CO_2$ blanket) until a temperature of 250–270° C. was reached. At this point the reaction mass was completely homogenous, had a dark color and was highly viscous. The reaction mass was then cooled resulting in a rubbery plasticizer material having slight tackiness. The plasticizer material was mixed for milling in the following proportions:

| | Parts |
|---|---|
| Polyvinyl chloride resin (Geon 101) | 100 |
| Plasticizer | 80 |
| Ferro 1820 stabilizer | 2 |
| Ferro 903 stabilizer | 1 |

The milling was performed on a 2 roll rubber mill at 335° F., using the procedure described above. The material of this example was easily processed and resulted in a tough, pliable, translucent construction. A 20 mil thick sheet was tested for perchloroethylene extraction using the same method as for Examples 1–33. It showed a perchloroethylene extraction of 3.0%. It may be noted by comparing this result with that of Example 9 that a significant improvement is obtained over the extraction properties of the same plasticizer composition without a super-polyester polymer.

The unique plasticizer products disclosed herein have many related plasticizer uses, such as in electrical wire coating and electrical tape applications in addition to the drycleanable vinyl applications specifically described.

Various modifications may be made to the polymeric polyester plasticizers specifically described above without departing from the scope of the invention which is to be measured by the appended claims:

What we claim is:
1. A polyester composition consisting essentially of
  (a) a non-chain terminated polymeric polyester having a molecular weight range of from 1500 to 30,000, said polyester resulting from the esterification of at least two different $C_4$ to $C_{12}$ alkanedioic acids, at least one $C_2$ to $C_3$ alkylene glycol and at least one different $C_3$ to $C_6$ alkylene glycol, the content of dibasic acids below $C_6$ being 0 to 50 equivalent percent, the content of $C_6$ to $C_9$ dibasic acids being from 50 to 100 equivalent percent and the content of $C_{10}$ to $C_{12}$ dibasic acids being zero to 50 equivalent percent, all based on the total equivalents of dibasic acid in the mixture, and the content of $C_2$ to $C_3$ and $C_3$ to $C_6$ glycols each being from 20 to 80 equivalent percent based on the total equivalents of glycol in the mixture, and
  (b) from about 1% by weight to 40% by weight of a high molecular weight polyester obtained from the reaction of terephthalic acid and ethylene glycol, said polyester having a molecular weight of at least 15,000.

2. A vinyl fabric in which the vinyl resin is plasticized with the composition of claim 1.
3. The polyester of claim 2 wherein said alkanediol is neopentyl glycol.
4. The polyester of claim 2 wherein said alkanediol is 1,4 butanediol.

References Cited

UNITED STATES PATENTS 3,501,554   3/1970   Aylesworth et al. ____ 260—873

WILLIAM H. SHORT, Primary Examiner

E. WOODBERRY, Assistant Examiner

U.S. Cl. X.R.

260—860, 873